US012445757B2

(12) United States Patent
Ruiter

(10) Patent No.: US 12,445,757 B2
(45) Date of Patent: Oct. 14, 2025

(54) INSULATED GLASS UNIT WITH INTEGRATED AUDIO SPEAKER

(71) Applicant: ODL, Incorporated, Zeeland, MI (US)

(72) Inventor: Andrew K. Ruiter, West Olive, MI (US)

(73) Assignee: ODL, Incorporated, Zeeland, MI (US)

( * ) Notice: Subject to any disclaimer, the term of this patent is extended or adjusted under 35 U.S.C. 154(b) by 159 days.

(21) Appl. No.: 18/517,754

(22) Filed: Nov. 22, 2023

(65) Prior Publication Data

US 2024/0187767 A1 Jun. 6, 2024

Related U.S. Application Data

(60) Provisional application No. 63/430,214, filed on Dec. 5, 2022.

(51) Int. Cl.
*H04R 1/02* (2006.01)

(52) U.S. Cl.
CPC .................................... *H04R 1/025* (2013.01)

(58) Field of Classification Search
CPC ...................................................... H04R 1/025
USPC .......................................................... 381/152
See application file for complete search history.

(56) References Cited

U.S. PATENT DOCUMENTS 8,434,904 B2 5/2013 Alvarez
9,906,867 B2 2/2018 Bongiovi et al.
10,728,641 B2 * 7/2020 Lee ........................ H04R 7/045
11,747,905 B2 * 9/2023 Ham ...................... H04R 1/028 381/333
12,177,629 B2 * 12/2024 Kim ....................... H04R 17/00

FOREIGN PATENT DOCUMENTS

CN 206993387 U * 2/2018 ....... G02F 1/133308
CN 108810760 A * 11/2018 ............... H04R 9/06
CN 111385723 A * 7/2020 ........... H04R 1/2803
EP 2374051 A1 10/2011
WO 2010/063320 A1 6/2010

* cited by examiner

*Primary Examiner* — Sean H Nguyen
(74) *Attorney, Agent, or Firm* — Barnes & Thornburg LLP

(57) ABSTRACT

An insulated glass unit (IGU) with integrated audio speaker may include first and second spaced-apart panels, a spacer affixed to inner surfaces of each of the first and second panels about a periphery of the first and second panels to define an airspace bounded by the spacer and the first and second panels, and a transducer assembly disposed in the airspace, the transducer assembly including a voice coil affixed to the inner surface of the first panel and a magnet operatively coupled to the voice coil, the voice coil responsive to audio drive signals to move relative to the magnet, and the first panel responsive to movement of the voice coil to vibrate so as to serve as a diaphragm of the audio speaker.

20 Claims, 1 Drawing Sheet

INSULATED GLASS UNIT WITH INTEGRATED AUDIO SPEAKER

CROSS-REFERENCE TO RELATED APPLICATION

This application claims the benefit of and priority to U.S. Provisional Patent Application Ser. No. 63/430,214, filed Dec. 5, 2022, the disclosure of which is incorporated herein by reference in its entirety.

FIELD

The present disclosure relates generally to insulated glass units (IGUs), and more specifically to such IGUs having a at least one audio transducer mounted therein such that the combination creates an audio speaker.

BACKGROUND

Insulated glass units (IGUs) conventionally include at least two spaced apart panels affixed about their opposed peripheries to a spacer to define an airspace therebetween. Some such IGUs include electronic components mounted to one or both of the panels.

SUMMARY

The present invention may comprise one or more of the features recited in the attached claims, and/or one or more of the following features and combinations thereof. In a first aspect, an insulated glass unit (IGU) with integrated audio speaker may comprise first and second spaced-apart panels, a spacer affixed to inner surfaces of each of the first and second panels about a periphery of the first and second panels to define an airspace bounded by the spacer and the first and second panels, and a transducer assembly disposed in the airspace, the transducer assembly including a voice coil affixed to the inner surface of the first panel and a magnet operatively coupled to the voice coil, the voice coil responsive to audio drive signals to move relative to the magnet, and the first panel responsive to movement of the voice coil to vibrate so as to serve as a diaphragm of the audio speaker.

In another aspect, an audio system may comprise the IGU with integrated audio speaker including the features of the first aspect, and an audio source configured to produce the audio input signals and to supply the audio input signals to the signal input of the input device.

DETAILED DESCRIPTION OF THE DRAWINGS

Figure 1:
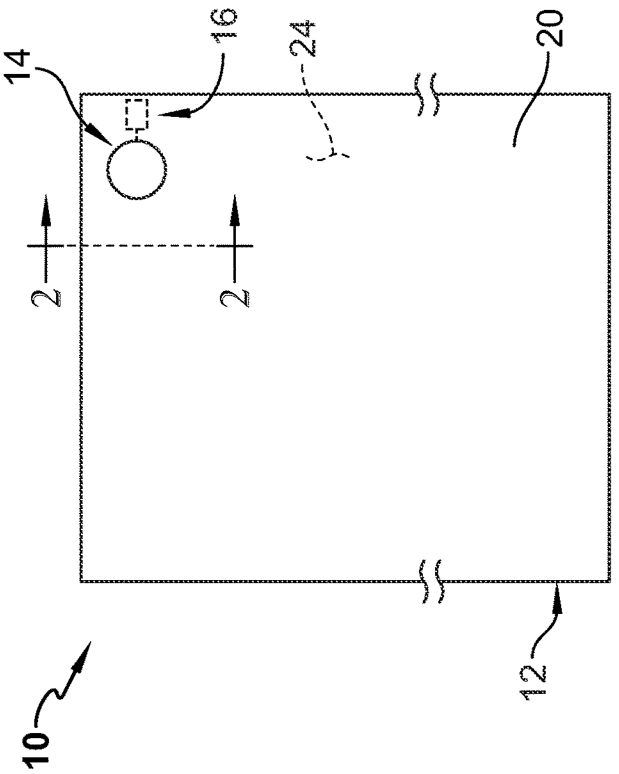
FIG. 1 is a front elevational view of an embodiment of an insulated glass unit (IGU) including an integrated audio speaker.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Referring now to FIG. 1, an embodiment is shown of a combination insulated glass unit (IGU) with integrated audio speaker 10. In the illustrated embodiment, an insulated glass unit (IGU) 12 illustratively includes two spaced-apart panels 18, 20 and a spacer 22 affixed to and between an inner surface 18A of one panel and an inner surface 20A of the other panel about a periphery of each of the panels 18, 20 to define an airspace 24 bounded by the inner surface of the spacer 22 and the inner surfaces 18A, 20A of the two panels 18, 20. Illustratively, conventional adhesive or other bonding material may be used to affix the spacer 22 to the panels 18, 20 so as to hermetically seal the airspace 24.

In the illustrated embodiment, the IGU 12 is a single-pane IGU wherein each of the panels 18, 20 comprises a single panel. In some alternate embodiments, either or both panels 18, 20 may comprise two or more panels spaced apart from one another and/or bonded to one another in a conventional manner. In any case, the panels 18, 20 may illustratively be formed of any conventional material(s), examples of which include, but are not limited to, glass, polycarbonate, acrylic, fiberglass or the like, although other materials may alternatively be used. Either or both of the panels 18, 20 may be completely transparent, transparent in one or more areas but translucent and/or opaque in one or more other areas, completely translucent or completely opaque. The IGU 12 is illustratively configured to be mounted in an opening of a wall or roof of conventional building, or mounted in an opening of a conventional door which is operatively mounted to a building. The IGU 12 may accordingly be, or be part of, a conventional window, skylight, door light or the like. The "building," as this term is used above and hereinbelow, may be any conventional structure with a roof and walls, and may be any such structure used, or intended to be used, for residential, commercial, educational, institutional, industrial, municipal and/or storage purposes.

Figure 2:
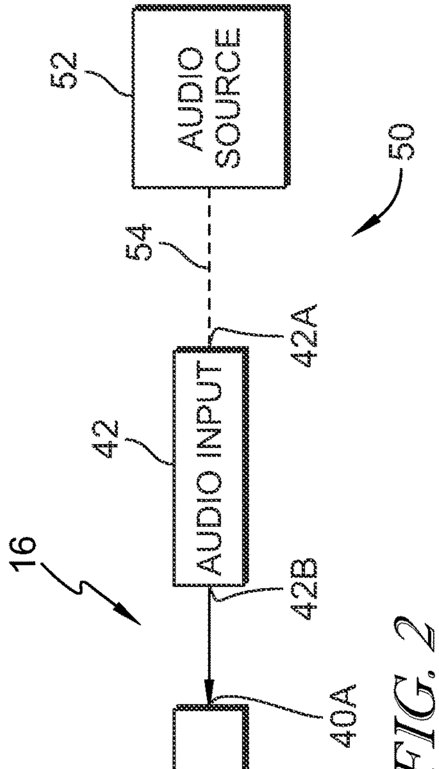
FIG. 2 is a cross-sectional view of the IGU of FIG. 1 as viewed along section lines 2-2.
Figure 2:
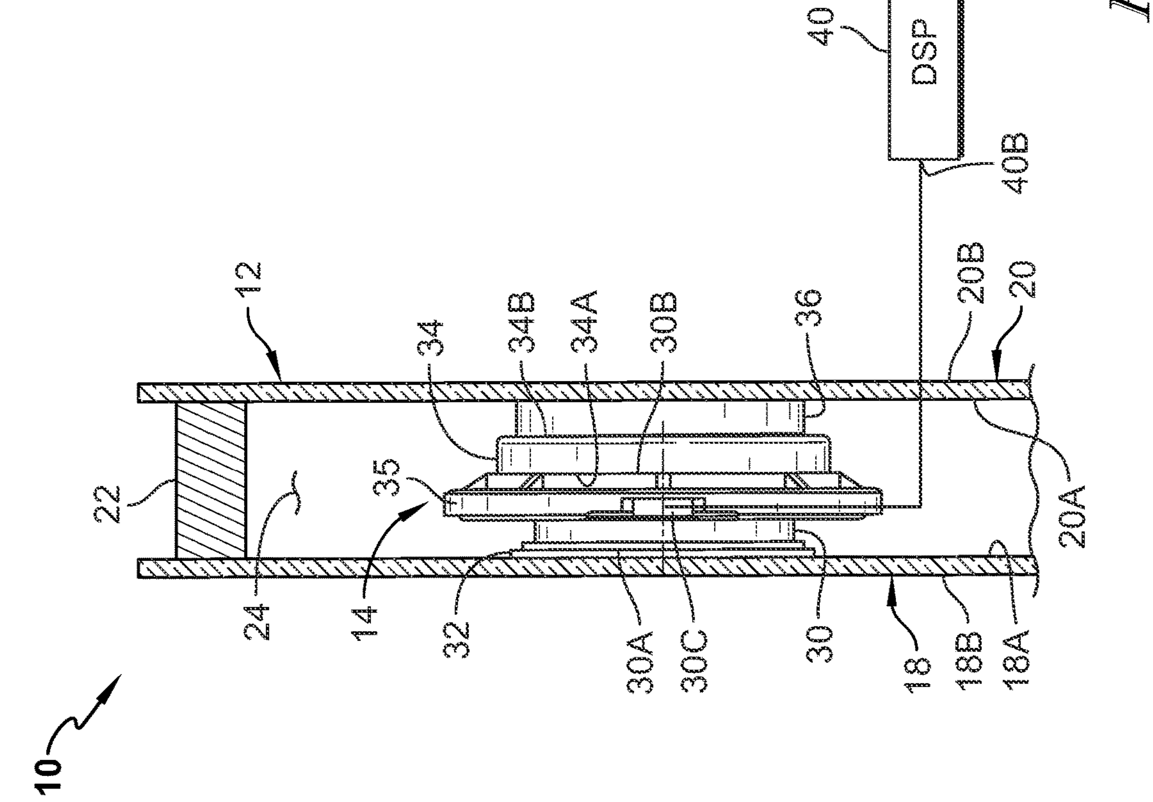

The IGU with integrated audio speaker 10 illustratively includes a transducer assembly 14 disposed within the airspace 24. The transducer assembly 14 illustratively includes a conventional voice coil 30 having one end 30A mechanically affixed to the inner surface 18A of the IGU panel 18 by a conventional adhesive and/or bonding medium 32. In one example embodiment, the medium 32 is a conventional pressure sensitive adhesive, although in alternate embodiments one or more other conventional adhesives and/or bonding media may be used. An opposite end 30B of the voice coil 30 is operatively mounted in a conventional manner to one end 34A of a conventional permanent magnet 34, e.g., the end 30B of the voice coil 30 is received within a ring-shaped opening formed in the end 34A of the magnet 34, and the magnet 34 is mounted to a conventional housing 35. A damping member 36 is illustratively affixed to and between an opposite end 34B of the magnet 34 and the inner surface 20A of the panel 20. The transducer assembly 14 may illustratively be positioned anywhere within the airspace 24 of the IGU 12, and in the embodiment illustrated in FIG. 1 the transducer assembly 14 is depicted by example as being positioned in the upper right corner of the IGU 12. It will be understood that whereas FIGS. 1 and 2 depict only a single transducer assembly 14 operatively mounted to and within the IGU 12, embodiments are contemplated which may include two or more transducer assemblies 14 operatively mounted to and within the IGU 12, each as described above with respect to the single transducer assembly 14.

The voice coil 30 is operable in a conventional manner in which the voice coil 30 is responsive to electrical signals received at a signal input 30C thereof to move relative to the magnet 34. Because the end 30A of the voice coil 30 is affixed to the panel 18, the panel 18 is, in turn, responsive to movement of the voice coil 30 to vibrate so as to serve as a diaphragm of a conventional audio speaker. The transducer assembly 14 and the panel 18 of the IGU 12 thus together make up an integrated audio speaker. In this regard, the phrase "IGU with integrated audio speaker, for purposes of this document, should be understood to mean that the combination of the insulated glass unit (IGU) 12 and the transducer assembly 14 mounted therein together form an audio speaker in which a panel 18 to which a voice 30 coil of the transducer assembly 14 is operatively mounted serves as the diaphragm or cone of the audio speaker. In some applications, e.g., "interior audio applications," the IGU with integrated audio speaker 10 may be mounted to a door or building such that the outer surface 18B of the panel 18 faces an interior space of the building and the outer surface 20B of the panel 20 faces the exterior environment of the building or another interior space of the building that is separated by at least the IGU 12 from the interior space which the surface 18B of the panel 18 faces. In such applications, the audio content produced by the IG with integrated audio speaker 10 will be directed outwardly from the panel surface 18B toward the interior space of the building. In other applications, e.g., "exterior audio applications," the IGU with integrated audio speaker 10 may be mounted to a door or building such that the outer surface 18B of the panel 18 faces an exterior environment of the building and the outer surface 20B of the panel 20 faces an interior space of the building. In such applications, the audio content produced by the IG with integrated audio speaker 10 will be directed outwardly from the panel surface 18B toward the exterior environment of the building.

In the illustrated embodiment, the voice coil 30 is implemented as a single voice coil. In alternate embodiments, the transducer assembly 14 may include multiple voice coils. In any case, the embodiment of the transducer assembly 14 shown in FIG. 2 is illustratively configured to prevent, or at least minimize or reduce, vibrations of the panel 20 of the IGU 12 which may result from movement of the voice coil 30 as just described and/or to direct energy resulting from movement of the voice coil 30 relative to the magnet 34 toward the panel 18. In this regard, the transducer assembly 14 illustratively includes the damping member 36 affixed to and between the magnet 34 (or housing 35) of the transducer assembly 14 and the inner surface 20A of the panel 20, wherein the damping member 36 is, in some embodiments, formed of a material (or materials) configured to isolate the panel 20 from vibrations resulting from movement of the voice coil 30 in response to the electrical input signals as described above and/or to damp any vibration of the panel 20 resulting from such movement of the voice coil 30. Alternatively or additionally, the damping member 36 may be formed of one or more materials configured to direct energy resulting from movement of the coil 30 relative to the magnet 34 toward the panel 18 so as to focus and concentrate such energy on the panel 18 to maximize the amplitudes of the vibrations generated by such energy on the panel 18 while, in some embodiments, also allowing for some amount of movement of the magnet relative to the panel 20. In some embodiments, the damping member 36 may be a resilient material, although in alternate embodiments the damping member 36 may be rigid or semi-rigid. In one example embodiment, the damping member 36 is provided in the form of an open-cell foam material conventionally used in acoustic treatment applications for sound and/or noise attenuation, although it will be understood that the damping member 36 may alternatively be formed of one or combination of other conventional sound dissipation and/or isolation materials. In any case, the damping member 36 may be provided in the form of a single structure or in the form of two or more structures mounted to and between the magnet 34 and the inner surface 20A of the panel 20.

The IGU with integrated audio speaker 10 illustratively further includes an audio signal processing interface 16 electrically coupled to the signal input 30C of the voice coil 30. The audio signal processing interface 16 illustratively includes a conventional digital signal processor 40 having a signal input 40A and a signal output 40B, wherein the signal output 40B is electrically connected to the signal input 30C of the voice coil 30. The audio signal processing interface 16 further illustratively includes a conventional input device 42 having a signal input 42A and a signal output 42B, wherein the signal output 42B is electrically connected to the signal input 40A of the digital signal processor 40. In one embodiment, the audio signal processing interface 16 may be mounted and positioned within the airspace 24 of the IGU 12 as illustrated by example in FIG. 1. Alternatively, the audio signal processing interface 16 may be disposed outside of the airspace 24. Alternatively still, one of the digital signal processor 40 and the input device 42 may be mounted and positioned within the airspace 24 and the other of the digital signal processor 40 and the input device 42 may be disposed outside of the airspace 24. In any case, it will be understood that all references made herein to "input" or "output" are intended to be inclusive of embodiments in which the input and/or output includes a single input and/or output and embodiments in which the input and/or output includes two or more such inputs and/or two or more such outputs.

The digital signal processor 40 illustratively includes at least one processor and at least one memory having instructions stored therein which are executable by the processor(s) to process audio input signals received at the signal input 40A thereof and produce audio drive signals at the output 40B, which audio drive signals are supplied to the signal input 30C of the voice coil 30, to drive movement of the voice coil based on one or more physical parameters of the panel 18 so as to achieve a target audio frequency response of the panel 18 in response to such driven movement of the voice coil 30. Example physical parameters of the panel 18 may include, but are not limited to, the peripheral dimensions of the panel 18 (bounded by the inner surface of the spacer 22), e.g., width, length, radius, diameter, etc., number of panels 18, thickness(es) of the panel(s) 18, etc. In one example embodiment, the target frequency response of the panel 18 is illustratively approximately 150 Hz-12 kHz, although in other embodiments the target frequency response may be defined by lower or higher frequency endpoints. In any case, the digital signal processor 40 is configured, via execution of instructions stored in memory, to modify the audio input signals so as to drive the voice coil 30 in a manner which tunes the panel 18 to operate in a desired range of frequencies, i.e., which tunes the panel 18 to a desired frequency response.

An audio system 50 is also illustrated in FIG. 2 and may illustratively include the IGU with integrated audio speaker 12 as described above, including the audio signal processor interface 16, and an audio source 52 configured to supply audio input signals to the signal input 42A of the audio input device 42 via a conventional communication path 54. In one embodiment, the communication path 54 may be or include one or more wires such that the audio source 52 is hardwire connected, or connectable, to the audio input device 42. In such embodiments, the audio input device 42 may illustratively be or include a conventional electrical connector for connecting to a complementarily configured electrical connector of the communication path 54. In some such embodiments, the audio input device 42 may further include conventional audio signal processing circuitry, e.g., for the purpose of buffering, amplifying and/or filtering noise from the audio input signals supplied by the audio source 52. In some embodiments, the audio input device 42 may alternatively or additionally include conventional electrical protection circuitry. In alternate embodiments, the communication path 54 depicted in FIG. 2 may represent a wireless communication path. In such embodiments, the audio input device 42 may illustratively be or include a conventional wireless signal receiver and decoder, and in such embodiments the audio source 52 will include a conventional wireless signal encoder and transmitter. In such embodiments, the wireless receivers/transmitters of the audio input device 42 and the audio source 52 respectively communicate wirelessly using any conventional wireless communication protocol, examples of which include, but are not limited to, Bluetooth®, WLAN (Wi-Fi), infrared, cellular, satellite, or the like.

The audio source 52 may be any conventional audio source, without limitation. In some embodiments, the audio source 52 may be configured for one-way communication, i.e., strictly to provide audio content to the IGU with integrated audio speaker 10 for reproduction, via corresponding vibrations of the panel 18, of the audio content. In alternate embodiments, the audio source 52 may be configured for two-way communication, i.e., to provide audio content to the IGU with integrated audio speaker 10 for reproduction, via corresponding vibrations of the panel 18, of the audio content, and to receive audio input, e.g., in the form of voice commands. In the latter case, the transducer assembly 14 will be responsive to vibrations of the panel 18, in response to spoken voice commands directed toward or in the vicinity of the panel 18, to supply corresponding electrical signals through the audio signal processor interface 16 to the audio source 52. Examples of the audio source 52 may include, but are not limited to, a conventional music source, i.e., a music playback device, computer, mobile device, etc., a video source which produces audio content, e.g., a television, computer, portable video game, etc., a streaming audio source, a streaming video source with audio content, a mobile telephone (e.g., for hands-free communication), an intercom system, electronic doorbell, electronic climate control, security alert, e.g., smoke and/or $CO_2$ detection, alarm system warning, security audio, e.g., dog bark/growl in response to unauthorized entry detection, indoor/outdoor communication system, e.g., to enable communications through a closed entry door, or the like.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. An insulated glass unit (IGU) with integrated audio speaker, comprising:

first and second spaced-apart panels, a spacer affixed to inner surfaces of each of the first and second panels about a periphery of the first and second panels to define an airspace bounded by the spacer and the first and second panels, and a transducer assembly disposed in the airspace, the transducer assembly including a voice coil affixed to the inner surface of the first panel and a magnet operatively coupled to the voice coil, the voice coil responsive to audio drive signals to move relative to the magnet, and the first panel responsive to movement of the voice coil to vibrate so as to serve as a diaphragm of the audio speaker.

2. The IGU with integrated audio speaker of claim 1, wherein the transducer assembly further includes a damping member affixed to and between the magnet and the inner surface of the second panel, the damping member configured to isolate the second panel from vibrations resulting from movement of the voice coil in response to the audio drive signals.

3. The IGU with integrated audio speaker of claim 2, wherein the damping member comprises a foam material.

4. The IGU with integrated audio speaker of claim 1, wherein the first panel comprises at least two panels spaced apart from or bonded to one another.

5. The IGU with integrated audio speaker of claim 1, wherein the voice coil comprises a single voice coil.

6. The IGU with integrated audio speaker of claim 1, wherein the voice coil comprises multiple voice coils.

7. The IGU with integrated audio speaker of claim 1, wherein the IGU is configured to be mounted in an opening of a building, or mounted in an opening of a door that is configured to be operatively mounted to a building, with the first panel facing an interior of the building.

8. The IGU with integrated audio speaker of claim 1, wherein the IGU is configured to be mounted in an opening of a building, or mounted in an opening of a door that is configured to be operatively mounted to a building, with the first panel facing an exterior environment of the building.

9. The IGU with integrated audio speaker of claim 1, further comprising a digital signal processor having an input configured to receive audio input signals and an output electrically connected to an audio signal input of the voice coil, the digital signal processor configured to process the audio input signals and produce the audio drive signals based on one or more physical parameters of the first panel so as to achieve a target audio frequency response of the first panel.

10. The IGU with integrated audio speaker of claim 9, wherein the one or more physical parameters of the first panel include at least one of peripheral dimensions of the first panel defined by the spacer and thickness of the first panel.

11. The IGU with integrated audio speaker of claim 9, further comprising an input device having a signal input and a signal output electrically connected to the input of the digital signal processor, the input device configured to receive the audio input signals at the signal input and to pass the audio input signals to the input of the digital signal processor.

12. The IGU with integrated audio speaker of claim 11, wherein the signal input of the input device is configured to hardwire connect to a source of the audio input signals or is configured to be wirelessly connected to the source of the audio input signals.

13. The IGU with integrated audio speaker of claim 11, wherein at least one of the digital signal processor and the input device is mounted within the airspace.

14. The IGU with integrated audio speaker of any claim 11, wherein the digital signal processor and the input device are both disposed outside of the airspace.

15. The IGU with integrated audio speaker of claim 9, wherein the digital signal processor is mounted within the airspace or is disposed outside of the airspace.

16. The IGU with integrated audio speaker of claim 1, further comprising two or more transducer assemblies each disposed in the airspace, wherein each of the two or more transducer assemblies include a respective voice coil affixed to the inner surface of the first panel and a respective magnet operatively coupled to the voice coil.

17. An audio system, comprising:

the IGU with integrated audio speaker of claim 1, and an audio source configured to produce the audio input signals and to supply the audio input signals to the signal input of the input device.

18. The audio system of claim 17, wherein the signal input of the input device is configured to be hardwire connected to the audio source or is configured to be wirelessly connected to the audio source.

19. The audio system of claim 17, wherein the audio source comprises at least one of a music source, a video source, an intercom system, a streaming audio service and a mobile phone.

20. The audio system of any of claim 17, wherein the integrated audio speaker is operable as a microphone to provide for two-way communication with the audio source.

* * * * *